United States Patent Office 3,577,217
Patented May 4, 1971

---

3,577,217
PROCESS FOR RECOVERING A CHROMATE AND CUPRIC OXIDE BY DECOMPOSITION OF A CATALYST OR WASTE CATALYST OF COPPER CHROMITE
Takuo Machida, Takarazuka-shi, and Masataka Nakagawa, Yamato-Takada-shi, Japan, assignors to Sumitomo Chemical Company, Ltd., Osaka, Japan
No Drawing. Filed Sept. 30, 1968, Ser. No. 763,984
Int. Cl. C01g 37/14, 3/02
U.S. Cl. 23—56                2 Claims

ABSTRACT OF THE DISCLOSURE

A process is provided for recovering a chromate and cupric oxide by decomposition of a catalyst or waste catalyst of copper chromite mainly represented by the formula $$CuO \cdot CuCr_2O_4$$

which comprises the steps of
(a) mixing said catalyst or waste catalyst with an alkali metal compound of the formula $$(M)_n(B)_m$$

wherein
M is an alkali metal selected from sodium and potassium;
B is an oxygen atom, a carbonic radical, a bicarbonic radical or a hydroxy radical; and
each $m$ and $n$ is either 1 or 2, dependent upon the respective valences of M and B;
(b) heating the resultant mixture of (a) at a temperature of from 300° C. to 1200° C. in the presence of oxygen or a molecular oxygen-containing gas; and
(c) mixing the resultant mixture of (b) with water to recover cupric oxide as an insoluble solid and a chromic acid salt of said alkali metal as an aqueous solution.

---

This invention relates to a method of decomposing a copper chromite catalyst, and recovering the copper and chromium values which result from the decomposition.

In recent years, copper chromite of the formula $CuO \cdot CuCr_2O_4$ has been widely used as a catalyst for hydrogenating ketones, carboxylic esters, nitro compounds, and the like as described in Japanese patent publication No. 2133/65, as well as Jikken Kagaku Koza, "The reaction of Organic Compound I" (B), vol. 17, p. 342 and "Organic Reactions," vol. 8, p. 9 (1954). Some copper chromite catalysts are sold industrially. However, at the present time when the catalyst is no longer useful it has been considered a waste material and discarded, no effort having been made for the recovery and use of the components.

An object of the invention is therefore to recover the copper and chromium values of waste catalysts of copper chromite, hence providing a commercial supply of the components as intermediates in the copper and chromium industries and commercially advancing the copper-chromium catalyst industry.

A further object of the invention is to lower the production cost of copper chromite catalysts by resynthesizing the catalysts through known methods from materials such as chromic anhydride, dichromate, copper nitrate and copper sulfate which are produced from the recovered products of the process of the invention, thus allowing a more economical hydrogenation process.

According to the present invention, a copper chromate catalyst mainly represented by the formula $CuO \cdot CuCr_2O_4$ is decomposed to a mixture of a chromate of the formula $(M)_2CrO_4$ wherein M is a sodium or potassium atom, and cupric oxide, by reacting the catalyst or waste catalyst with an alkali metal compound of the formula $(M)_n(B)_m$ wherein M is as defined above, B is oxygen, carbonic, bicarbonic or hydroxyl radical and $m$ and $n$ are each 1 or 2 dependent upon the valence of M and B. The process may be conducted in the presence or absence of air or oxygen. After mixing the reactants the resultant mixture is poured into water which may be hot water and boiled to recover cupric oxide as an insoluble solid and an aqueous solution of sodium or potassium chromate.

Considering the invention in greater detail, the process of the invention is carried out by mixing, optionally with grinding, the waste copper chromite catalyst with a stoichiometric amount based on the amount of chromium content of the alkali metal compound, and heating the mixture to a temperature of about 300 to about 1,200° C. in the presence or absence of air or oxygen. Although, the time required for completion of the reaction is greatly influenced by the reaction temperature, generally about 30 minutes to 8 hours is requried, depending upon the reaction temperature. Agitation of the mixture is not always necessary; however, the reaction is preferably carried out under agitation.

The alkali metal reactant includes, for example, sodium and potassium carbonate, sodium and potassium bicarbonate, sodium and potassium oxide, and sodium and potassium peroxide.

The reaction mixture is poured into about 1 to 5 times by weight of water or hot water and boiled from about 0.5 to about 3 hours..

The aqueous system containing the chromate as a solute and cupric oxide as insoluble matter is subjected to filtration to mutually separate the components. The filtrate may be concentrated to crystallize the chromate to obtain the same as solid. The cupric oxide thus obtained and the chromate values can be utilized not only as a raw material for the production of copper chromite catalysts, but also as intermediates of various chromium and copper-industries.

Through the use of an aqueous chromate solution as recovered, compounds such as bichromate and chromic anhydride may be synthesized. The cupric oxide may be converted into copper nitrate, copper sulfate and the like by reacting with an inorganic mineral acid according to conventional procedures known in the art.

As the typical reactions of the process of the invention may be mentioned the following reaction schemes:

(1) $CuO \cdot CuCr_2O_4 + 2Na_2CO_3 \rightarrow 2CuO$
$+ 2Na_2CrO_4 + CO + C$
$CO + C + 3O \rightarrow 2CO_3$ (2) $CuO \cdot CuCr_2C_4 + 4NaHCO_3 \rightarrow 2CuO$
$+ 2Na_2CrO_4 + 2H_2O + CO_2 + 3CO$
$3CO + 3O \rightarrow 3CO_2$ (3) $CuO \cdot CuCr_2O_4 + 4KOH + 3O \rightarrow 2CuO$
$+ 2K_2CrO_4 + 2H_2O$ (4) $CuO \cdot CuCr_2O_4 + 4NaOH + 3O \rightarrow 2CuO$
$+ 2Na_2CrO_4 + 2H_2O$ (5) $CuO \cdot CuCr_2O_4 + 2Na_2O + 3O \rightarrow 2CuO + 2Na_2CrO_4$ (6) $CuO \cdot CuCr_2O_4 + 2Na_2O_2 + O \rightarrow 2CuO + 2Na_2CrO_4$ As shown in the above reaction formulae, it will be appreciated that the present reaction is preferably carried out in the presence of oxygen or air.

Copper chromite catalysts, the starting materials of the present invention, are those prepared by the decomposition of basic copper ammonium chromate as shown by H. Adkins "Organic Reactions" vol. 8, page 9 (1954), and used for hydrogenation reactions. The copper chromite catalyst may contain as the promoter a small amount of one or more of the elements of Fe, Ni, Co, Pt, Zn, Ba, Ca, Mg, Mn, and Al. As the binder or carrier a small amount of a material such as diatomaceous earth, sodium silicate, kaolin, graphite, and active carbon may be used. These promoters, binders and carriers are of course contaminated in the recovered chromate or copper compound, however, the contaminants are removed through conventional purification techniques, such as precipitation, recrystallization or chromatography. This procedure may be carried out for each dichromate, cupric nitrate or copper sulfate which is derived from the recovered chromate or copper compound.

Waste copper chromite catalysts directly after use is of a reduced type having copper exhibiting a reddish brown color; it is unstable as described in "Organic Reactions" vol. 8, page 8 (1954); it is also easily oxidized by contact with air at room temperature to form a copper chromite. At high temperature the oxidation proceeds further, and at such a high temperature as in the process of the present invention, the waste catalyst changes to an almost stable oxidized form before the decomposition reaction of the waste catalyst begins.

The copper chromite directly after use may be used as the starting raw material of the process of the present invention; however, in this case much air or oxygen is required than the case of the use of oxidized type, and is not economical. Accordingly, it is preferable to employ an oxidized form of the waste catalyst, which has been oxidized by contacting with air, either at room temperature or a higher temperature. Molded catalysts, such as pellets or tablets are preferably employed after having been crushed by a mortar or feather mill.

The present invention is illustrated more precisely by the following examples which are provided solely for that purpose and we should not be construed as limiting the scope of the invention.

EXAMPLE 1

320 grams of copper chromite waste catalyst containing 39.6 percent by weight of Cu and 32.5 percent by weight of Cr was mixed under grinding with 212 grams of anhydrous sodium carbonate in a mortar. The mixture was placed in a beaker and allowed to react with agitation in an electric furnace at a temperature of 760° C. for 4 hours. After being cooled, the reaction mixture was added to 500 ml. of water and boiled for about 30 minutes and filtered.

The insoluble matter was washed with 100 ml. of hot water, and the washed water was combined with the filtrate, and the aqueous solution was concentrated by distilling off the water. When the hot concentrated solution was cooled, 677 grams of a yellow crystal was obtained. The analysis of the crystal showed the following chromium content.

Calculated as $Na_2CrO_4 \cdot 10H_2O$ (percent): 15.2. Found (percent): 15.2.

The analysis by means of X-ray diffraction method showed that the crystal conformed with the crystal of pure sodium chromate decahydrate, $Na_2CrO_4 \cdot 10H_2O$.

The theoretical yield of chromium in the decomposition reaction was 99 percent.

The insoluble matter was dried, and 165 grams of black powder solid was obtained. This solid was confirmed as cupric oxide as the result of X-ray diffraction analysis. The analysis of the copper present showed that it contained metallic copper in an amount of 75.59 percent by weight and cupric oxide of 94.6 percent by weight.

The decompositions reaction proceeded almost completely which was shown from the facts that the theoretical yield of copper was 98 percent and the recovered cupric oxide contained unreacted chromium in an amount of only 0.002 percent by weight.

A copper chromite catalyst was synthesized by the use of copper nitrate and sodium dichromate as the raw materials, prepared from the cupric oxide and aqueous solution of sodium chromate as obtained in this example. A comparative test of the catalyst was conducted in the preparation of pentanol-(1) by hydrogenating ethyl valerate. A comparison was made of the activity of the ordinal copper chromite catalyst and catalyst prepared by this example. The theoretical yields of the pentanol-(1) in both tests were identical, 93 percent.

EXAMPLE 2

320 grams of copper cromite waste catalyst containing 39.6 percent by weight of Cu and 32.5 percent by weight of Cr were mixed under grinding with 276 grams of anhydrous potassium carbonate in a mortar. The mixture was placed in a porcelain dish, and allowed to react while passing oxygen gas in an electric furnace at a temperature of about 800° C. to about 1,000° C. for 3 hours.

After following the subsequent procedures set forth in Example 1, 377 grams of potassium chromate was obtained. An analysis of the chromate showed the following chromium content:

Calculated as $K_2CrO_4$ (percent): 26.8. Found (percent): 26.8.

The theoretical yield of chromium was therefore 97 percent.

166 grams of cupric oxide was also obtained. The analysis of the oxide showed 94.6 percent purity of the cupric oxide; the theoretical yield of copper was 99 percent.

EXAMPLE 3

155.5 grams of copper chromite containing 40.8 percent by weight of Cu and 33.4 percent by weight of Cr were mixed under grinding with 168 grams of sodium bicarbonate in a mortar. The mixture was placed in a stainless steel beaker, and allowed to react by heating the mixture at 400° to 800° C. for 6 hours while passing air and agitating.

After following the subsequent procedures set forth in Example 1, 308 grams of sodium chromate decahydrate crystal, $Na_2CrO_4 \cdot 10H_2O$, were obtained. The theoretical yield of Cr was 90.0 percent in this decomposition reaction.

81.3 grams of cupric oxide were also recovered, having a purity of 95.7 percent. The theoretical yield of copper in the decomposition reaction was 98 percent. The decomposition reaction proceeded almost completely, though the cupric oxide contained 0.5 percent by weight of unreacted chromium.

EXAMPLE 4

320 grams of copper chromite containing 39.6 percent by weight of Cu and 32.5 percent by weight of Cr were mixed under grinding with 160 grams of solid sodium hydroxide. The mixture was placed in a porcelain beaker, and allowed to react by heating in an electric furnace at about 500° to 1,000° C. for 5 hours while agitating and passing air.

After following the subsequent procedures as in Example 1. 583 grams of sodium chromate decahydrate crystal, $Na_2CrO_4 \cdot 10H_2O$, and 163 grams of cupric oxide were recovered.

Analysis of Cr in the crystal showed as follows: Calculated as $Na_2CrO_4 \cdot 10H_2O$ (percent): 15.2. Found (percent): 15.3.

Thus, the theoretical yield of Cr was 85 percent.

The cupric oxide recovered has a purity of 96.3 percent as determined by chemical analysis. The theoretical recovering yield of Cu was 99 percent. Though the cupric oxide contained 0.4 percent of unreacted chromium, the decomposition reaction was observed to proceed almost completely.

EXAMPLE 5

Into a porcelain dish there were placed 8.0 grams of solid sodium hydroxide and 4.6 grams of metallic sodium; the mixture carefully observed and heated to more than 300° C. The thus obtained still hot sodium oxide was added to 31.1 grams of copper chromite containing 40.83 percent by weight of Cu and 33.44 percent of Cr. The mixture was allowed to react in an electric furnace at a temperature of 750° C. for 4 hours while agitating and passing air over the dish.

After following the subsequent procedures as set forth in Example 1, 55.0 grams of sodium chromate decahydrate crystal, $Na_2CrO_4 \cdot 10H_2O$, and 15.7 grams of cupric oxide were recovered. The analysis of chromium in the sodium chromate crystal showed the following value.

Calculated as $Na_2CrO_4 \cdot 10H_2O$ (percent): 15.2. Found (percent): 15.16.

The theoretical yield of Cr was calculated as 80 percent, accordingly.

The purity of the cupric oxide thus recovered was 99.0 percent as evaluated by analysis, although 0.01 percent of chromium were contained in the oxide. Thus, the decomposition reaction was observed to proceed almost completely.

EXAMPLE 6

A porcelain dish was heated to 350° C. in an electric furnace, and air was passed therethrough. Under careful observation, 9.2 grams of metallic sodium was added into the dish stepwise in a fragment. Thus, sodium peroxide was prepared. The still hot sodium peroxide was added to 31.1 grams of copper chromite containing 40.83 percent by weight of Cu and 33.44 percent by weight of Cr. The mixture was allowed to react at a temperature of 760° C. for 4 hours while agitating and passing air thereover.

After following the subsequent procedures as set forth in Example 1, 61.5 grams of sodium chromate decahydrate crystal, $Na_2CrO_4 \cdot 10H_2O$, and 16.5 grams of cupric oxide were recovered.

The analysis of chromium in thus obtained crystal showed the following value:

Calculated as $Na_2CrO_4 \cdot 10H_2O$ (percent): 15.2. Found (percent): 15.25.

The yield of chromium recovered was calculated as 90 percent.

The analysis of the cupric oxide showed a purity of 93.5 percent, and though it contained the unreacted chromium in an amount of 0.03 percent by weight, the yield of Cu converted was 97 percent, showing that the decomposition reaction proceeded almost completely.

What we claim is:
1. A process for recovering a chromate and cupric oxide by decomposition of a catalyst or waste catalyst of copper chromite mainly represented by the formula

$$CuO \cdot CuCr_2O_4$$

which comprises the steps of
(a) mixing said catalyst or waste catalyst with an alkali metal compound of the formula $$(M)_n(B)_m$$

wherein
M is an alkali metal selected from sodium and potassium;
B is an oxygen atom, a carbonic radical, a bicarbonic radical or a hydroxy radical; and
each $m$ and $n$ is either 1 or 2, dependent upon the respective valences of M and B;
(b) heating the resultant mixture of (a) at a temperature of from 300° C. to 1200° C. in the presence of oxygen or a molecular oxygen-containing gas; and
(c) mixing the resultant mixture of (b) with water to recover cupric oxide as an insoluble solid and a chromic acid salt of said alkali metal as an aqueous solution.

2. A process according to claim 1, wherein said chromic acid salt of the alkali metal is recovered by concentrating the aqueous solution to crystalize the same.

References Cited

UNITED STATES PATENTS

| | | | |
|---|---|---|---|
| 2,205,141 | 6/1940 | Heard | 23—56X |
| 2,493,789 | 1/1950 | Udy | 23—56 |
| 3,403,970 | 10/1968 | Culbertson et al. | 23—56 |

FOREIGN PATENTS

| | | | |
|---|---|---|---|
| 257,892 | 9/1963 | Australia | 23—147 |

HERBERT T. CARTER, Primary Examiner

U.S. Cl. X.R.

23—147; 252—476, 467